United States Patent
De Filippis

(10) Patent No.: US 8,981,616 B2
(45) Date of Patent: Mar. 17, 2015

(54) ELECTRIC MOTOR AND BRUSH HOLDER SPRING

(75) Inventor: Pietro De Filippis, Varazze (IT)

(73) Assignee: SPAL Automotive S.r.l. (IT)

( * ) Notice: Subject to any disclaimer, the term of this patent is extended or adjusted under 35 U.S.C. 154(b) by 199 days.

(21) Appl. No.: 13/063,635

(22) PCT Filed: Sep. 11, 2009

(86) PCT No.: PCT/IB2009/053985
§ 371 (c)(1),
(2), (4) Date: Mar. 11, 2011

(87) PCT Pub. No.: WO2010/032185
PCT Pub. Date: Mar. 25, 2010

(65) Prior Publication Data
US 2011/0169383 A1    Jul. 14, 2011

(30) Foreign Application Priority Data
Sep. 18, 2008    (IT) .............................. BO2008A0572

(51) Int. Cl.
*H02K 5/14* (2006.01)
*H02K 11/02* (2006.01)
*H01R 39/40* (2006.01)
*H01R 39/415* (2006.01)

(52) U.S. Cl.
CPC .............. *H02K 5/148* (2013.01); *H01R 39/415* (2013.01); *H02K 11/026* (2013.01)
USPC .......................... 310/245; 310/242; 310/68 R

(58) Field of Classification Search
CPC ....................................... H01R 39/38
USPC ......................... 310/239, 242, 249
See application file for complete search history.

(56) References Cited

U.S. PATENT DOCUMENTS

| | | | |
|---|---|---|---|
| 3,025,421 A | 3/1962 | Sievert | |
| 3,898,492 A * | 8/1975 | Vassos et al. | 310/242 |
| 4,389,588 A * | 6/1983 | Rankin | 310/242 |
| 6,717,301 B2 * | 4/2004 | DeDaran et al. | 310/68 R |
| 6,975,059 B2 * | 12/2005 | Sakai et al. | 310/239 |
| 2007/0210672 A1 | 9/2007 | Fleminger | |
| 2007/0224439 A1 * | 9/2007 | Holmberg | 428/548 |

FOREIGN PATENT DOCUMENTS

| | | |
|---|---|---|
| DE | 19750038 | 5/1999 |
| DE | 29803270 | 7/1999 |
| EP | 1075076 | 2/2001 |

OTHER PUBLICATIONS

International Search Report and Written Opinion dated Jul. 23, 2010 from corresponding application.

* cited by examiner

*Primary Examiner* — Quyen Leung
*Assistant Examiner* — Eric Johnson
(74) *Attorney, Agent, or Firm* — Timothy J. Klima; Shuttleworth & Ingersoll, PLC

(57) ABSTRACT

An electric motor (1) comprises a casing (2), a stator housed in the casing (2), a sealing cover (10), a rotor (6) rotatable inside the casing (2) and equipped with a commutator (7), a circuit (8) for powering the commutator (7) comprising two brushes (15) in sliding contact with the commutator (7); the motor (1) comprises two brush holder sleeves (14) in which the brushes (15) slide and two springs (17) operating between the brush holder sleeves (14) and the respective brushes (15) in such a way as to push the latter towards the commutator (7); both the sleeves (14) and the springs (17) form part of the circuit (8) for powering the brushes (15).

14 Claims, 3 Drawing Sheets

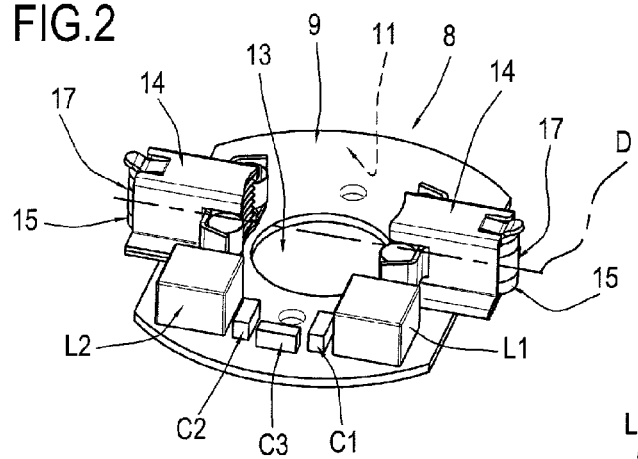
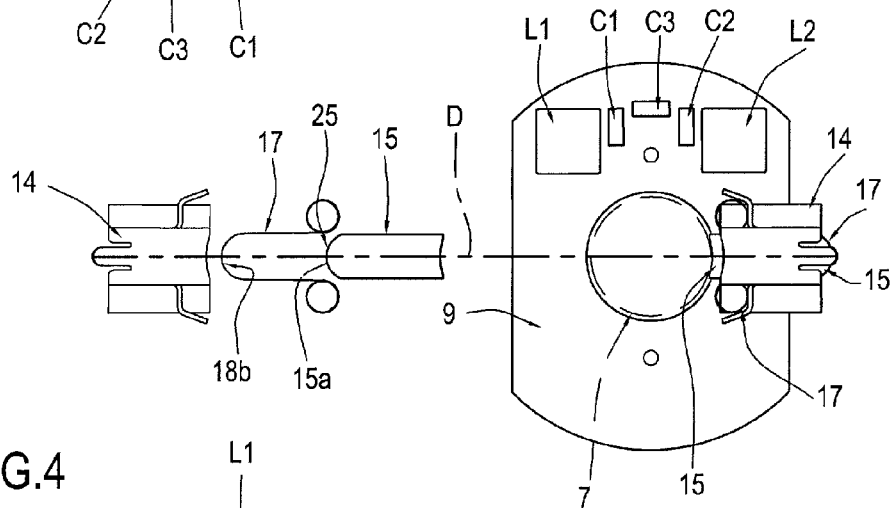
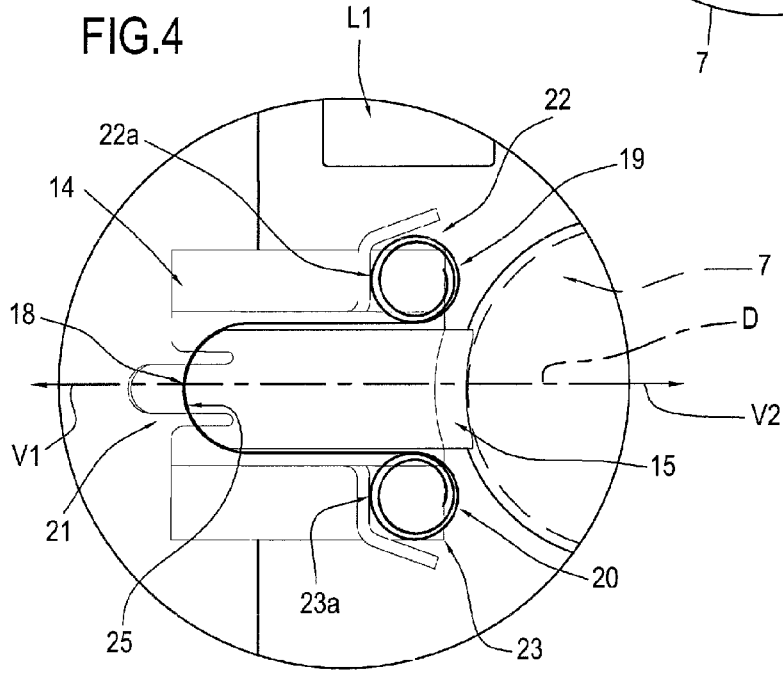

ELECTRIC MOTOR AND BRUSH HOLDER SPRING

This application is the National Phase of International Application PCT/IB2009/053985 filed Sep. 11, 2009 which designated the U.S. and that International Application was published under PCT Article 21(2) in English.

This application claims priority to Italian Patent Application No. BO2008A000572 filed Sep. 18, 2008 and PCT Application No. PCT/IB2009/053985 filed Sep. 11, 2009, which applications are incorporated by reference herein.

TECHNICAL FIELD

This invention relates to a brushed electric motor and, in particular, to a brushed electric motor for automotive applications.

BACKGROUND ART

Known in the prior art are low-power brushed electric motors with built-in filters for suppressing electromagnetic noise due to motor operation and a motor power supply circuit, in particular for powering the commutator attached to the rotor. The filters and power supply circuit are mounted between the motor casing and cover.

The commutator is powered by the power supply circuit which comprises brushes mounted in suitable holder sleeves along which they are pushed towards the commutator by springs which contribute to brush wear.

The brushes are connected to the external power supply by a braided conductor, normally of copper, and noise is suppressed by simple inductors connected in series with the brushes.

These motors have operating temperature limits in that they cannot operate at temperatures greater than 80°-85° without drastically reducing performance and, moreover, they are not satisfactory in terms of electromagnetic compatibility (EMI) because there is very little space inside them for filters other than the basic, and not very sophisticated, traditional inductors.

These aspects are even worse in the case of a sealed motor because the heat that develops inside the motor cannot be removed by forced air flows.

Another shortcoming of these motors is due to the presence of the braid, which must be especially soldered to the power supply circuit.

DISCLOSURE OF THE INVENTION

In this context, the main technical purpose of the present invention is to propose an electric motor which is free of the above mentioned disadvantage This invention has for an aim to provide a compact electric motor whose cooling system is optimized compared to prior art motors.

Another aim of the invention is to provide an electric motor that is satisfactory in terms of electromagnetic compatibility.

Yet another aim of the invention is to provide an electric motor that is quick and easy to mount.

The stated technical purpose and aims of the invention are substantially achieved by an electric motor as described herein.

BRIEF DESCRIPTION OF THE DRAWINGS

Further features and advantages of the present invention are more apparent in the detailed description below, with reference to a preferred, non-limiting, embodiment of an electric motor, as illustrated in the accompanying drawings, in which:

FIG. 2 is a schematic perspective view of a detail of the motor of FIG. 1;

FIG. 3 illustrates the detail of FIG. 2 in a schematic, partly exploded top plan view;

FIG. 4 is an enlarged top plan view schematically illustrating a part of the detail of FIG. 2;

DETAILED DESCRIPTION OF THE PREFERRED EMBODIMENTS OF THE INVENTION

Figure 1:
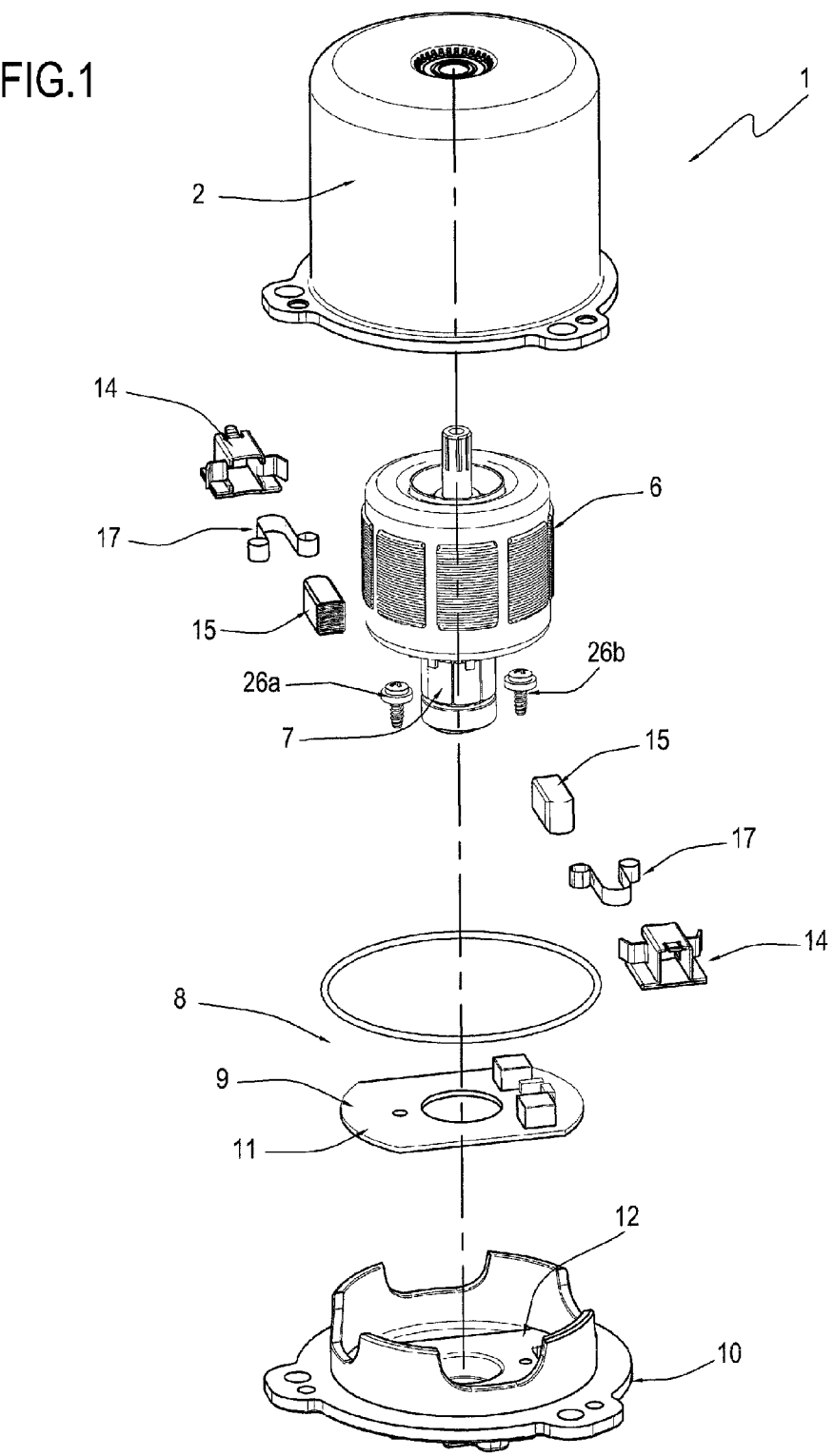
FIG. 1 is a schematic, partly exploded, perspective view of an electric motor according to this invention.

With reference to the accompanying drawings, the numeral 1 denotes an electric motor according to this invention.

The motor 1 comprises a casing 2 which houses stator magnets suitably positioned and mounted to form a stator unit or stator that is not illustrated since it is of substantially known type.

A rotor 6, equipped with a commutator 7, is housed in the casing 2 and is mounted in such a way as to rotate relative to the stator.

Substantially at the commutator 7 the motor 1 comprises a power supply circuit 8 or brush holder circuit 8, illustrated in particular in FIGS. 2, 3 and 4.

Figure 7:
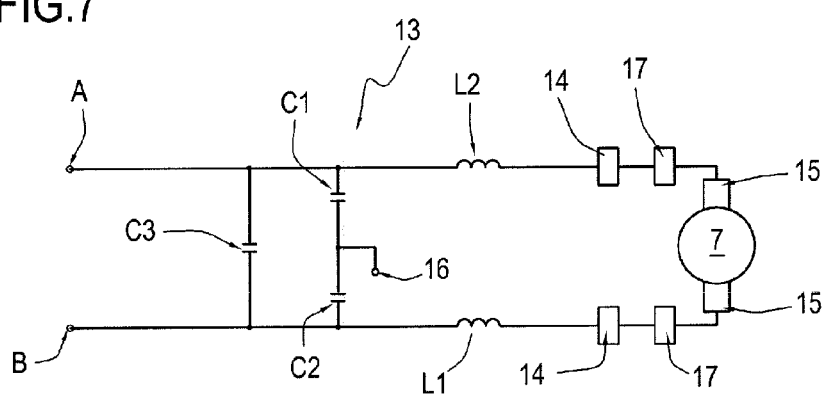
FIG. 7 is a circuit diagram, partly in blocks, representing the power supply circuit of the motor according to the invention.

An electric circuit diagram of the circuit 8, partly in blocks, is shown in FIG. 7 and is described below.

The power supply circuit 8 is made preferably according to prior art "surface mount technology" (SMT).

The power supply circuit 8 comprises a board 9 for mounting the components, described in more detail below, made according to SMT and thus referred to as "surface mounting devices" (SMD).

In a first embodiment, the mounting board 9 is in the form of traditional printed circuit board.

Alternatively, to further improve the heat exchange capacity of the board 9, the latter may be in the form of a prior art isolated metal substrate (IMS). The IMS comprises a metal base, a dielectric isolator and a conductive copper layer.

Generally speaking, as schematically illustrated in FIG. 7, the board 9 has etched on it the electric tracks that make up the motor 1 power supply circuit 8.

The motor 1 comprises a cover 10 for sealing the casing 2 and the board 9 is fixed to the cover 10.

Advantageously, the cover 10 is made of thermally conductive material, such as aluminium.

The board 9 is connected to the cover 10 in such a way as to maximize the heat exchange surface between the board 9 and the cover 10.

Preferably, the board 9 has a flat surface 11 for coming into contact with the cover 10. The cover 10 also has a corresponding flat inside surface 12 for coupling to the board 9.

The contact between the surface 11 and the surface 12 is such as to guarantee the maximum heat exchange.

The circuit 8 comprises an electromagnetic noise suppressor filter 13.

The circuit 8 also comprises the brush holder sleeves 14 in which the brushes 15 slide.

The motor 1 illustrated by way of an example comprises a pair of brushes 15 mounted opposite each other along a diametric line D.

The filter 13, as schematically illustrated in FIG. 7, comprises a set of three capacitors C1, C2, C3 and a pair of inductors L1, L2 connected as shown in the diagram.

Preferably, between the capacitors C1 and C2 there is a corn on potential node 16.

The node 16 is electrically connected to the aluminium cover 10 which constitutes the electrical reference for C1 and C2.

Preferably, the cover 10 is connected by a screw 26 which is Iso used to fasten the board 9 to the cover 10.

A second screw 26a acts in conjunction with the first screw 26 to fasten the board 9 to the cover 10.

As mentioned above, the capacitors C1, C2 and C3 and the inductors L1 and L2 are SMD components of substantially known type.

It should be noted that the inductors L1 and L2 are of the type comprising a sealed magnetic circuit to minimize magnetic flux dispersion. These inductors are known as "shielded" inductors.

According to this invention, the brush holder sleeves 14 are also made in such a way that they can be assembled with the rest of the electric circuit 8 sing SMT.

Thus, construction of the circuit 8 is considerably simplified since all the components, namely the capacitors C1, C2, C3, the inductors L1, L2 and the brush holder sleeves 14 are placed on the board 9 and subsequently sold; red by placing the assembly in a heating tunnel.

The circuit 8 thus has a pair of terminals A and B for powering the motor 1 and through which the motor 1 can be connected to an external tower source, not illustrated.

It should be noted that construction of the brush holder circuit 8 using SMT also significantly reduces assembly time compared to mounting of traditional brush holders.

To make the most of this advantage, it is also important to dispense with the traditional braided connection used to connect the brushes to an external power circuit.

The motor 1 according to the invention comprises springs 17 operating between each brush holder sleeve 14 and the respective brush 15 in order to keep the latter in contact with the commutator 7.

Each spring 17 is also used to power the respective brush 15.

According to the invention, as clearly shown in the diagram in FIG. 7, each spring 17 provides an electrical connection between the brush 15 and the respective holder sleeve 14 which can in turn be connected to the external power source.

In other words, in the motor 1 according to the invention, she springs 17 are multipurpose, that is, each applies to a brush 15 a constant pressure towards the commutator 7 and at the same time ensures electrical contact between the brush 15 and the sleeve 14.

Referring for simplicity to a single sleeve 14-spring 17-brush 15 assembly, attention is drawn to the following.

Figure 5:
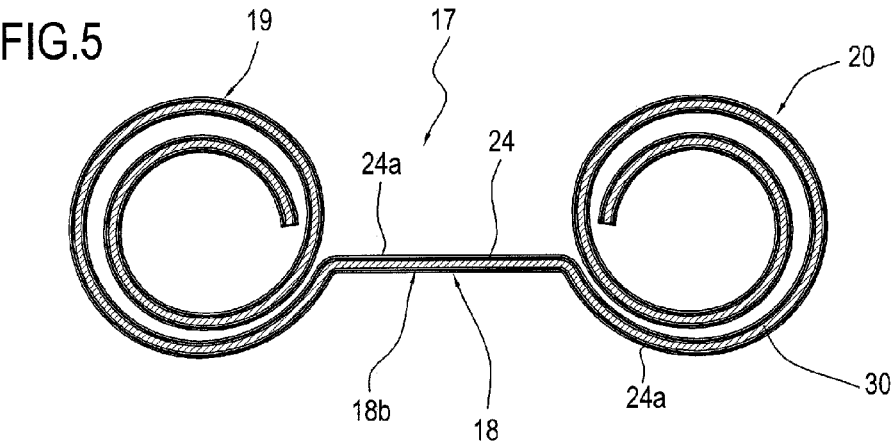
FIG. 5 is a schematic top plan cross-section of a detail of the motor of FIG. 1.
Figure 6:
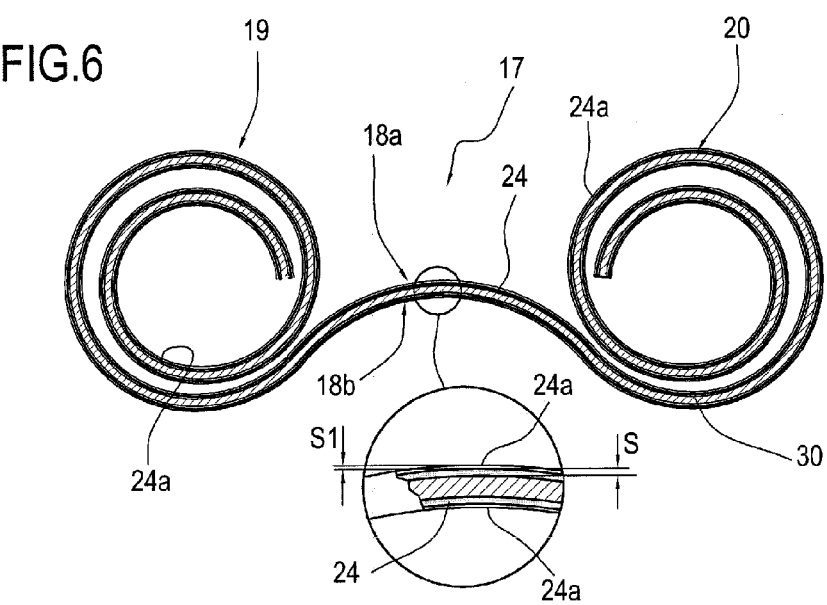
FIG. 6 is a schematic top plan cross-section of a second embodiment of the detail of FIG. 5.

As shown in FIGS. 5 and 6, the spring 17 is in the form of a suitably shaped piece of metal tape 30.

The tape 30 is made of spring steel, preferably stainless.

As will become clearer as this description continues, the tape 30 forms a first layer of the spring 17, to which two other layers of metal are applied, according to the invention.

The spring 17 has a central portion 18, 18a and two end portions 19, 20.

The end portions 19, 20 are curled, that is to say, they have a coiled shape or are wound in a spiral and are used to connect up with the sleeve 14.

In the embodiment illustrated in FIG. 5, the central portion 18 of the spring 17 is substantially rectilinear.

In the alternative embodiment illustrated in FIG. 6, the central portion 18a is curvilinear for the purposes that will become clearer as this description continues.

It should be noted that in FIGS. 1 and 3 the spring 17 is shown in the operating configuration, as if it were inserted in the sleeve 14.

The portion 18 is designed to make contact with the brush 5 and to push the latter towards the commutator 7. As mentioned above, the pushing action is preferably constant.

Looking in more detail, the brush holder sleeve 14 has a central groove 21 inside it which partly houses the spring 17 and in which the brush 15 runs.

The sleeve 14 also has a first and a second seat 22, 23 for accommodating the above mentioned end portions 19, 20 of the spring 17.

With reference in particular to FIG. 4, it may be observed that, in practice, once the brush 15 has been inserted into the groove 21, the central portion 18 of the spring 17 is pushed in direction V1 along the radial line D, thereby at least partly unwinding the end portions 19, 20.

In the case of a spring 17 according to the embodiment of FIG. 5, the rectilinear portion 18 adopts a curved shape and the portions 19 and 20 are partly unwound along the walls of the groove 21.

In other words, the rectilinear stretch 18 bends into the groove 21 to allow the spring 17 to be inserted into the groove.

In the case of a spring 17 shaped like that shown in FIG. 6, the central portion 18a keeps its curvature substantially unchanged.

In use, the springs 17 are inserted into the brush holder sleeves 14 with the portions 19 and 20 inserted in the seats 22 and 23.

The spring 17 is pushed into the groove 21 and part of the tape 30 is unwound from the spirals at the ends.

FIG. 4 shows how, once the commutator 7 has been fitted, the portions 19 and 20 tend to curl, that is to say, the tape 30 winds up again, imparting to the central portion 18 a motion in direction V2 in the groove 21 along the line D. This motion pushes the brush 15 in direction V2 against the commutator 7 to enable operation of the motor 1.

It should be noted that the spring 17 made in this way makes it possible to use the full length of the groove 21, allowing use of springs 15 of a length such that the motor 1 can be classified as a "long life" or "very long life" device.

In order to guarantee the electrical connection between brushes 15, springs 17, sleeves 14 and external power supply circuit, the sleeves 14 are mad of metal.

Advantageously, also, the springs 17 are coated with a conductive material since the steel they are normally made of does not provide satisfactory electrical performance.

As illustrated in FIGS. 5 and 6, the brush 15 has a coating 24 made of conductive material.

In the preferred embodiment illustrated, the coating 24 is applied to the spring 17 by plating, that is to say, the spring 17 is plated with the conductive material.

By way of an example, the coating 24 is made of copper, silver or gold. Preferably, the copper coating has a thickness S of between 5 μm and 10 μm.

In order to enhance the durability of the conductive coating 2 and protect it, for example, from weathering, each spring 17 is provided with a second protective coating 24a over the first, conductive coating 24.

Preferably, the second, protective coating 24a is made of nickel which, besides protection, also provides mechanical strength and good conductivity.

Preferably, the second, nickel coating 24a has a thickness S1 of between 1 µm and 2 µm.

The spring 17 thus takes the form of a multi-layer spring 17.

A spring steel core in the form of a piece of tape 30, constitutes a first layer and confers on the spring 17 good mechanical strength combined with the elastic properties of steel; the coating 24 of conductive material constitutes a second layer, making the spring 17 satisfactorily conductive so that the springs 17 can be correctly powered; and, lastly, the second coating 24a, besides not hindering conductivity, constitutes a third and last layer which protects the conductive coating 24 and enhance its durability.

In order to guarantee a good electrical connection between the spring 17 and the respective brush 15, the latter has a rear portion 25 that is rounded o that the surface that comes into contact with the spring 17 is as large as possible.

In other words, the curvature of the brush 15 maximizes the points of contact between the spring 17 and the brush 15, thus optimizing the electrical conductivity between them.

In particular, optimal contact is obtained with the central portion 18 of the spring 17 which, as mentioned above is also curved inside the groove 21.

It should be noted that, advantageously, if the portion 18a is also curved, as shown in FIG. 6, electrical performance is further improved.

In practice, as shown in FIG. 3, the spring 17 has an inside surface 18b that comes into contact with the brush 15.

In particular, the internal contact surface 18b is located at the central portion 18, 18a of the spring 17.

The brush 15 also has a surface 15a of preferential contact with the spring 17.

Advantageously, the contact surface 15a is located at the rounded portion 25.

Contact between the spring 17 and the sleeve 14 occurs especially at a zone 22a and a zone 23a of the seats 22, 23, respectively.

In practice, it is no longer necessary to provide a metal braid to power the brush 15 and follow its movement along the sleeve.

Assembly is thus considerably facilitated since, after soldering the SMD components with SMT, it is sufficient to slot the sleeves 14, springs 17 and brushes 15 into place.

The use of capacitors C1, C2, C3 and shielded inductors L1, L2 allows the construction of a filter 13 with enhanced performance which guarantees good electromagnetic compatibility for the motor 1.

The brush holder circuit 8 constructed on the board 9 and directly in contact with the cover 10, preferably of aluminium, dissipates heat very effectively, allowing the motor 1 to operate even at temperatures in the order of 120°-125° centigrade.

It should be noted that this thermal performance can be obtained with a motor 1 of the sealed type, which is the preferred embodiment of this invention.

The invention can advantageously also be applied to open motors.

The invention described above is susceptible of industrial application and may be modified and adapted in several ways without thereby departing from the scope of the inventive concept. Moreover, all details of the invention may be substituted by technically equivalent elements.

The invention claimed is:

1. An electric motor comprising:
   a casing;
   a stator housed in the casing;
   a cover which closes the casing;
   a rotor which revolves inside the casing and which is equipped with a commutator, a commutator power circuit comprising at least one brush in sliding contact with the commutator;
   at least one single piece brush holder sleeve having a single piece conductive metal shell, the metal shell having a radially extending internal groove in which the brush slides, the radially extending groove extending substantially to a radially outer end of the brush holder sleeve; the metal shell having an exposed interior metal surface exposed to an interior of the radially extending groove along an entire length of the radially extending groove to form a wall of the radially extending groove, the metal shell also having an electrical power connection portion and an entirely metal conductive path between the electrical power connection portion and the exposed interior metal surface;
   at least one spring engaging the metal shell and extending into the radially extending groove to be directly exposed to the exposed interior metal surface along substantially an entire length of the at least one spring extending into the radially extending groove, the at least one spring operating between the brush holder sleeve and the brush biasing the brush towards the commutator;
   wherein the power circuit comprises the at least one brush holder sleeve and the at least one spring for electrically powering the at least one brush, the at least one spring defining an electrical connection between the at least one brush and the at least one brush holder sleeve, with the electrical power connection portion being connectable to an external power source for electrically powering the at least one spring;
   wherein the at least one spring has a central portion for making electrical contact with the at least one brush, the central portion being curvilinear;
   wherein the at least one brush has a curvilinear rear portion conforming to the curvilinear central portion of the at least one spring for maximizing points of contact with the at least one spring.

2. The motor according to claim 1, wherein in that the at least one spring comprises at least one first coating of conductive material.

3. The motor according to claim 2, wherein a thickness (S) of the at least one first coating is between 1 µm and 10 µm.

4. The motor according to claim 2, wherein the at least one first coating comprises copper.

5. The motor according to claim 4, wherein a thickness (S) of the at least one first coating is between 5 µm and 10 µm.

6. The motor according to claim 1, wherein the at least one spring comprises a second protective coating.

7. The motor according to claim 6, wherein the second protective coating comprises nickel.

8. The motor according to claim 7, wherein a thickness (S1) of the second coating is between 1 µm and 2 µm.

9. The motor according to claim 1, wherein the at least one spring has at least one end portion for making electrical contact with the at least one brush holder sleeve.

10. The motor according to claim 1, wherein the at least one spring has at least one end portion rolled in a spiral which winds onto itself to keep the at least one brush biased against the commutator.

11. The motor according to claim 1, wherein the power circuit comprises a mounting plate and a plurality of SMD components attached to the mounting plate.

12. The motor according to claim 11, wherein the mounting plate is fastened to the cover to dissipate heat through the cover.

13. The motor according to claim 1, wherein the at least one brush holder sleeve is an SMD component.

14. The motor according to claim 11, wherein the power circuit comprises an electromagnetic noise suppressor filter comprising SMD components and housed inside the casing.

* * * * *